United States Patent
Tang et al.

(10) Patent No.: US 8,351,205 B2
(45) Date of Patent: Jan. 8, 2013

(54) HEAT DISSIPATION DEVICE

(75) Inventors: Xian-Xiu Tang, Shenzhen (CN); Zhen-Xing Ye, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 247 days.

(21) Appl. No.: 12/972,507

(22) Filed: Dec. 19, 2010

(65) Prior Publication Data

US 2012/0138263 A1 Jun. 7, 2012

(30) Foreign Application Priority Data

Dec. 4, 2010 (CN) .......................... 2010 1 0573341

(51) Int. Cl.
*H05K 7/20* (2006.01)

(52) U.S. Cl. .................. 361/695; 361/679.48; 361/690; 361/694

(58) Field of Classification Search .................. None
See application file for complete search history.

(56) References Cited

U.S. PATENT DOCUMENTS

| | | | | |
|---|---|---|---|---|
| 6,430,041 | B1 * | 8/2002 | Johnson et al. | 361/679.48 |
| 7,505,266 | B2 * | 3/2009 | Sanchez et al. | 361/695 |
| 7,580,259 | B2 * | 8/2009 | Hsiao | 361/695 |
| 7,626,819 | B1 * | 12/2009 | Chen | 361/695 |
| 7,791,881 | B2 * | 9/2010 | Chou et al. | 361/695 |
| 8,059,403 | B2 * | 11/2011 | Chou et al. | 361/695 |
| 8,064,199 | B2 * | 11/2011 | Lin | 361/695 |
| 2011/0103015 | A1 * | 5/2011 | Hirano et al. | 361/695 |

* cited by examiner

*Primary Examiner* — Boris Chervinsky
(74) *Attorney, Agent, or Firm* — Altis Law Group, Inc.

(57) ABSTRACT

A heat dissipation device is used to dissipate heat generated by a number of memory chips of a motherboard. The heat dissipation device includes two brackets attached to the motherboard and at opposite sides of the memory chips, are a support, and a fan. The support includes a fixing plate and two clamping plates extending from opposite ends of the fixing plate. The clamping plates are rotatably mounted to the brackets, and are positioned above the memory chips. The fan is sandwiched between the clamping plates or mounted to the fixing plate.

9 Claims, 7 Drawing Sheets

HEAT DISSIPATION DEVICE

BACKGROUND

1. Technical Field

The present disclosure relates to heat dissipation devices, and especially relates to a heat dissipation device for memory chips.

2. Description of Related Art

With the continuing development of electronic technology, memory chips generate more heat during operation than previously. The heat needs to be dissipated as quickly as possible. In some cases, two metallic cooling fins are added to opposite sides of each memory to dissipate heat therefrom. However, this method makes use of natural convection only, which is inefficient in dissipating heat generated by the memory chips.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
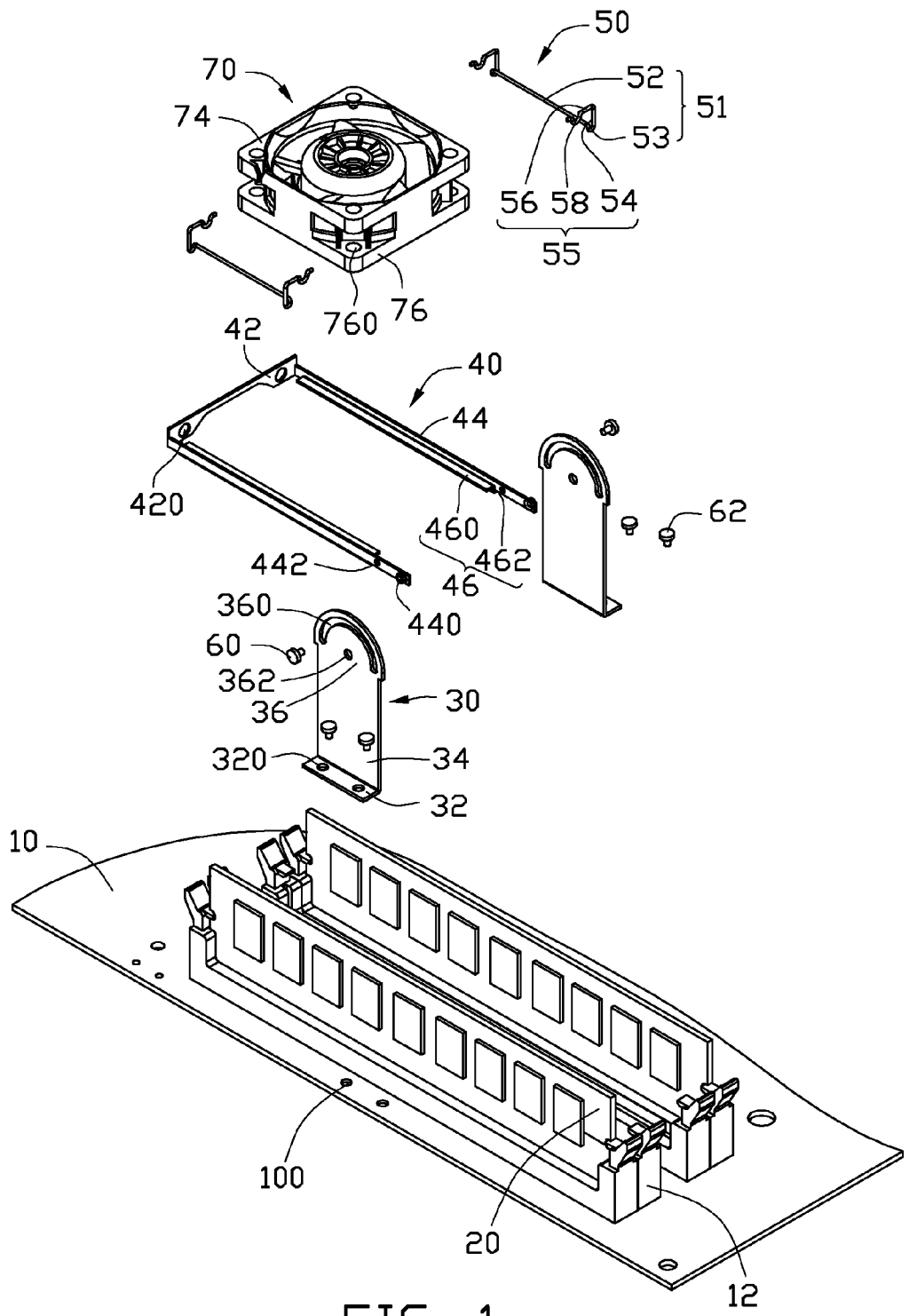
FIG. 1 is an exploded, isometric view of a first exemplary embodiment of a heat dissipation device, together with a motherboard and a plurality of memory chips.
Figure 2:
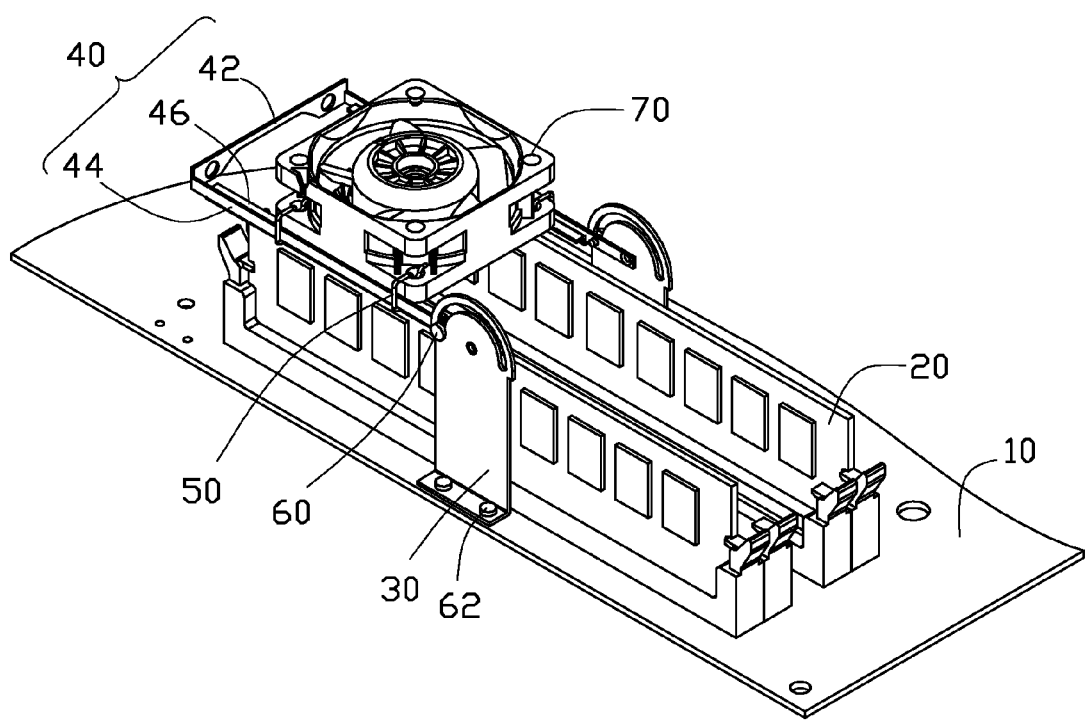
FIGS. 2 to 5 are assembled, isometric views of FIG. 1, showing different states of use.

Referring to FIGS. 1 and 2, a first exemplary embodiment of a heat dissipation device is used to dissipate heat generated by a plurality of memory chips 20 electrically connected to a motherboard 10. The heat dissipation device includes two brackets 30, a support 40, two latching members 50, two first fasteners 60, a plurality of second fasteners 62, and a fan 70.

The motherboard 10 includes a plurality of sockets 12 corresponding to the memory chips 20. The motherboard 10 defines two pairs of fixing holes 100 adjacent to center portions and at opposite sides of the memory chips 20.

Each bracket 30 includes a fixing plate 32 and a lateral plate 34 substantially perpendicularly extending up from a side of the fixing plate 32. A semicircular mounting plate 36 extends up from a distal end of the lateral plate 34 opposite to the fixing plate 32. The fixing plate 32 is rectangular, and defines a pair of through holes 320. The mounting plate 36 defines a pivot hole 362 in a center of a lower portion of the mounting plate 36, and an arc-shaped slide slot 360 extending through the mounting plate 36 surrounding the pivot hole 362. The pivot hole 362 is located at a center of a circle of the guide slot 360.

The support 40 is substantially U-shaped, and includes a bar-shaped fixing plate 42, two clamping plates 44 substantially perpendicularly extending from opposite ends of the fixing plate 42, and two supporting plates 46 each mounted to a corresponding clamping plate 44 and opposing the other clamping plate 44. The fixing plate 42 defines two through holes 420. A post 440 protrudes from a distal end of each clamping plate 44 opposite to the fixing plate 42, away from the other clamping plate 44. Each clamping plate 44 defines a fixing hole 442 between the post 440 and the clamping plate 44. A distance between the fixing hole 442 and the corresponding post 440 is equal to a radius of the slide slot 360. Each supporting plate 46 is substantially L-shaped, and includes fixing portion 462 fixed to the clamping plate 44, and a supporting portion 460 substantially perpendicularly extending from the fixing portion 462 toward the other clamping plate 44.

Each latching member 50 is made of elastic material. The latching member 50 includes a first latching portion 51 and two second latching portions 55. The first latching portion 51 includes a first engaging segment 52 and two first curved segments 53 extending from opposite ends of the first engaging segment 52. Each second latching portion 55 includes a connection segment 54 extending from a corresponding first curved segment 53 substantially perpendicular to the first engaging segment 52. A second engaging segment 56 substantially perpendicularly extending from a distal end of the connection segment 54 and perpendicular to the first engaging segment 52, and a second curved segment 58 extending from a distal end of the second engaging segment 56.

In this embodiment, the first fasteners 60 and the second fasteners 64 are screws.

The fan 70 includes an upper frame 74 and a lower frame 76 opposite to the upper frame 74. The lower frame 76 defines four fixing holes 760 in four corners of the lower frame 76.

Referring to FIGS. 2 to 5, in assembly, the through holes 320 of the brackets 30 are aligned with the corresponding fixing holes 100 of the motherboard 10 and the lateral plates 34 are located at opposite sides of the sockets 12. Two pairs of second fasteners 62 extend through the through holes 320 of the brackets 30 to engage in the pairs of fixing holes 100. Therefore, the brackets 30 are tightly fastened to the motherboard 10. The posts 440 of the support 40 are pivotably engaged in the pivot holes 362 of the brackets 30, to make the support 40 rotatable relative to the brackets 30. The support 40 is positioned above the memory chips 20. The fixing plate 42 is placed on each of opposite ends of the sockets 12, with the fixing holes 442 of the support 40 aligned with each of opposite ends of the slide slots 360. The first fasteners 60 extend through the slide slots 360 to engage in the fixing holes 442, to tightly fasten the support 40 to the brackets 30.

Figure 3:
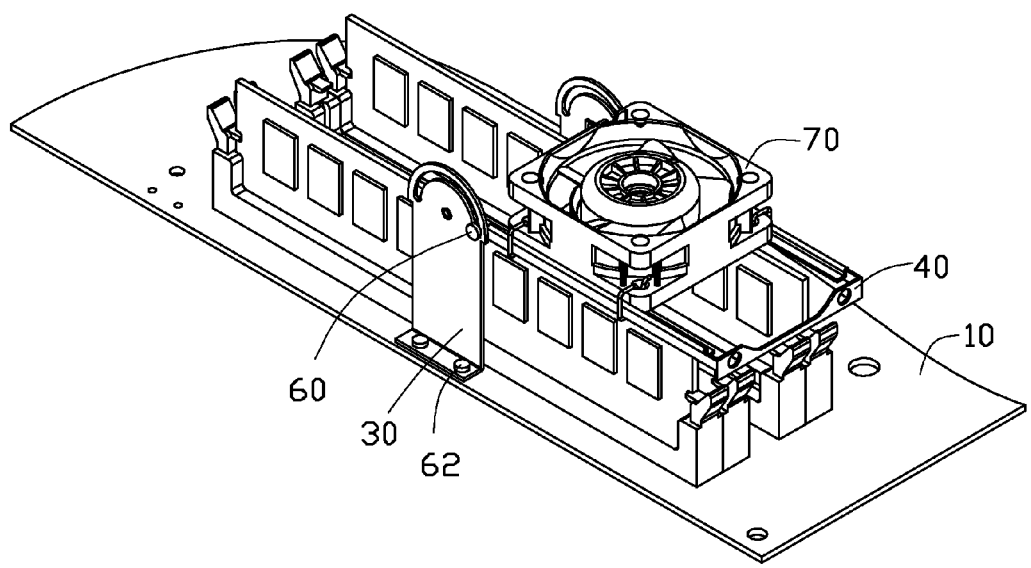

Referring to FIGS. 2 to 3, the fan 70 is positioned on the supporting portions 460 of the support 40, above the memory chips 20, with the lower frame 76 of the fan resisting against the supporting portions 460, and opposite sides of the fan 70 sandwiched between the clamping plates 44. The first engaging segments 52 of the latching members 50 resist against bottom surfaces of the supporting portions 460 opposite to the fan 70. The first curved segments 53 of the latching members 50 are tightly latched to the latching portions 462 and the clamping plates 44. The second engaging segments 56 of the latching members 50 resist against a top surface of the lower frame 76 of the fan 70. The second curved segments 58 of the latching members 50 are tightly latched into the fixing holes 760 of the lower frame 76 of the fan 70. Therefore, the fan 70 is mounted above the memory chips 20 to dissipate heat.

Figure 4:
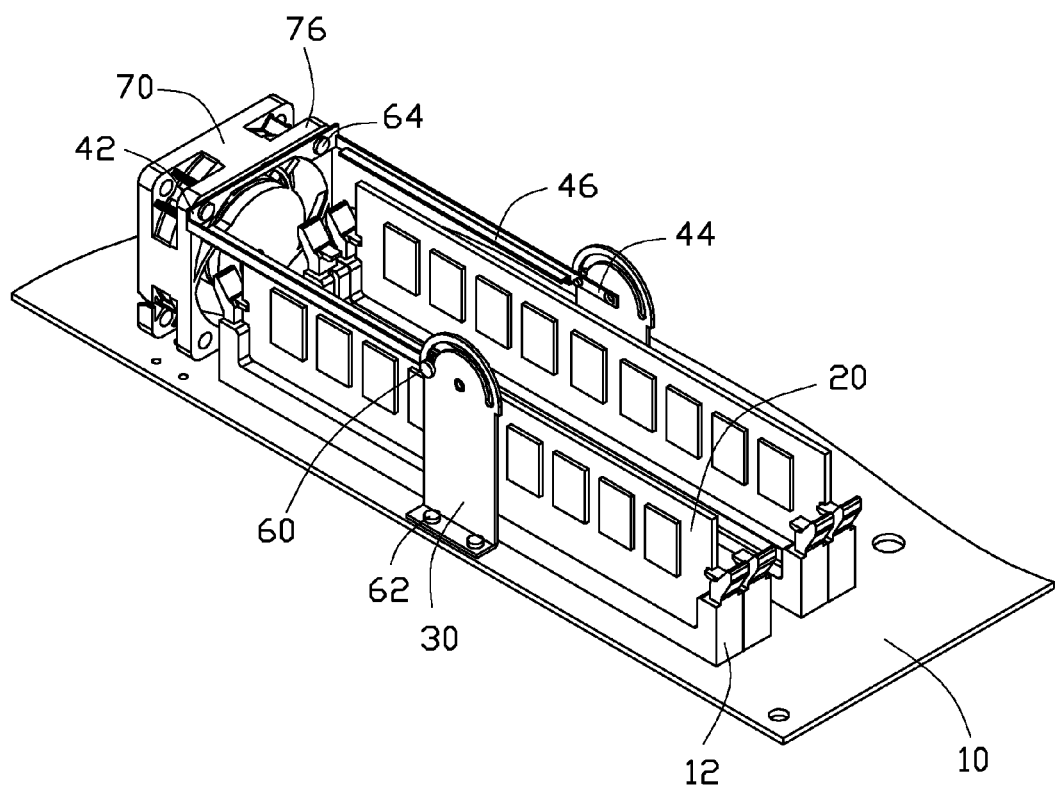
Figure 5:
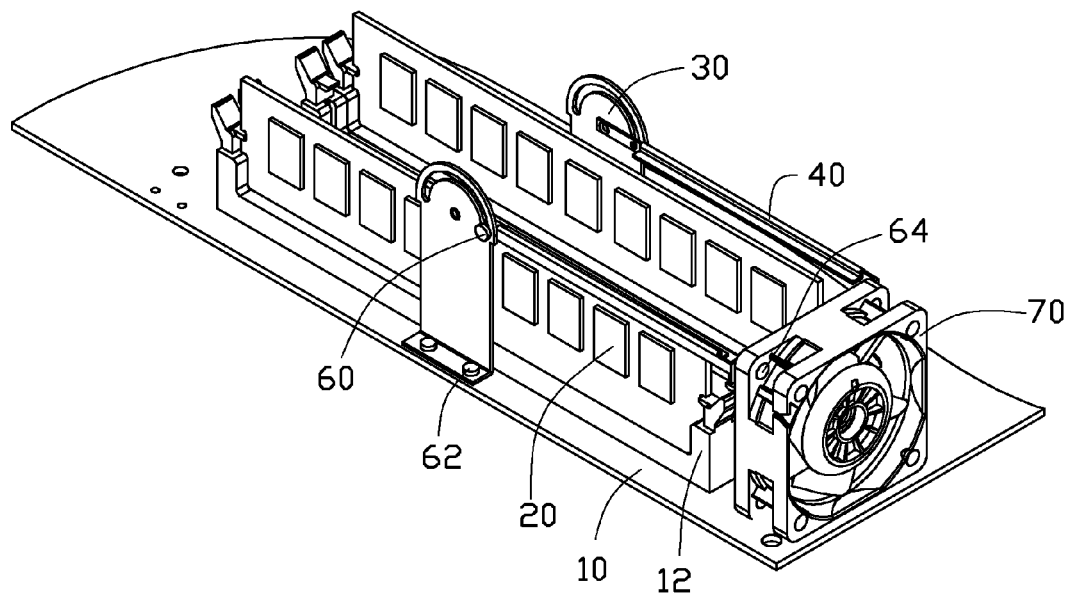

Referring to FIGS. 4 to 5, the fan 70 is positioned at opposite end surfaces of the memory chips 20. Two of the fixing holes 760 of the fan 70 are aligned with the through holes 420 of the fixing plate 42, and two second fasteners 64, such as screws, extend through the through holes 420 to engage in the corresponding fixing holes 760 to fasten the fan 70 to the support 40. Therefore, the fan 70 is mounted at opposite end surfaces of the memory chips 20 to dissipate heat.

Figure 6:
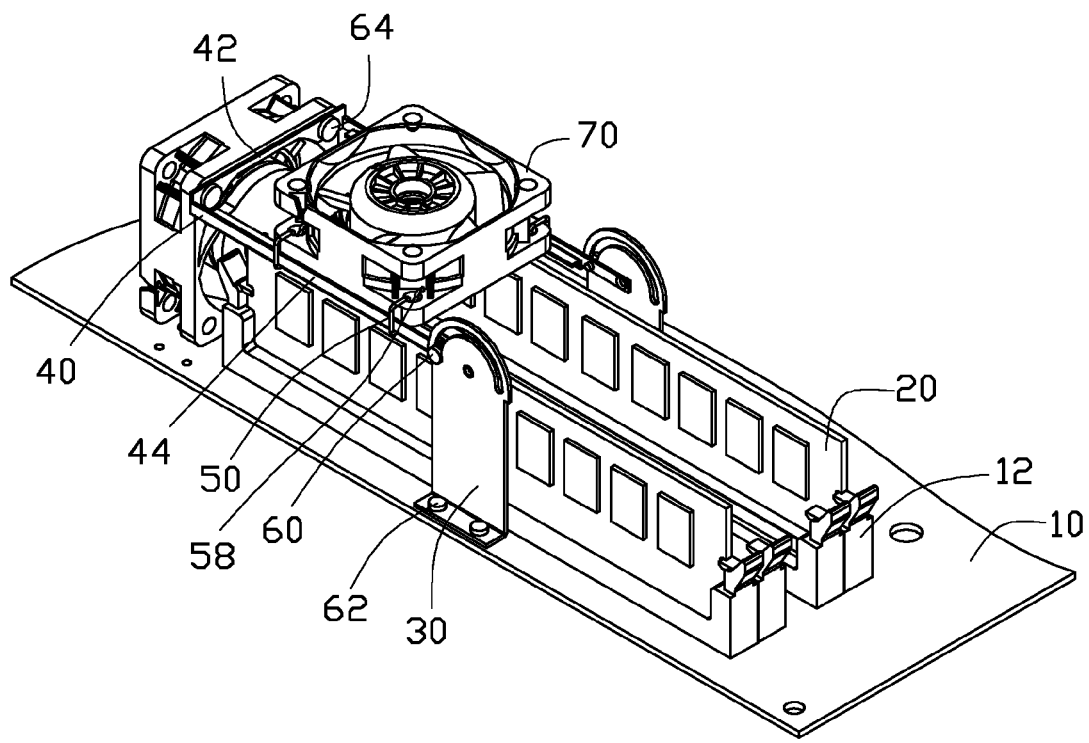
FIGS. 6 to 7 are assembled, isometric views of a second exemplary embodiment of a heat dissipation device, showing different states of use.
Figure 7:
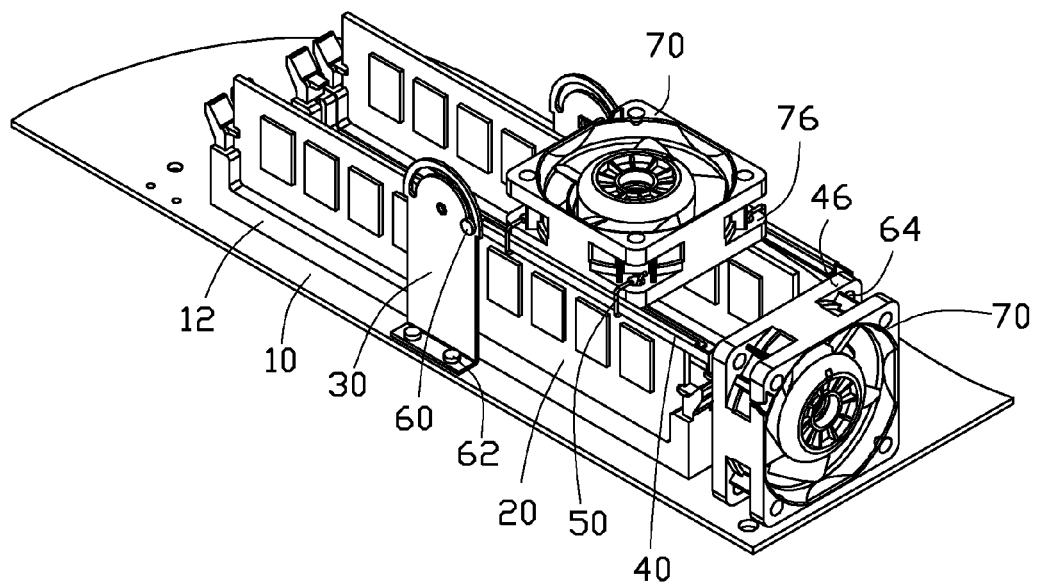

Referring to FIGS. 6 to 7, a second exemplary embodiment of a heat dissipation device is similar to the first exemplary embodiment of the heat dissipation device, except for the addition of two fans 70. The fans 70 are respectively fastened to the support plates 46 and the fixing plate 42. Therefore, the fans 70 are mounted above the memory chips 20 at one end surface of the memory chips 20 to respectively dissipate heat.

It is to be understood, however, that even though numerous characteristics and advantages of the embodiments have been set forth in the foregoing description, together with details of the structure and function of the embodiments, the present disclosure is illustrative only, and changes may be made in details, especially in matters of shape, size, and arrangement of parts within the principles of the embodiments to the full extent indicated by the broad general meaning of the terms in which the appended claims are expressed.

The invention claimed is:

1. A heat dissipation device used to dissipate heat generated by a plurality of memory chips of a motherboard, the heat dissipation device comprising:
   two brackets attached to the motherboard and at opposite sides of the memory chips;
   a support comprising a fixing plate and two clamping plates extending from opposite ends of the fixing plate, wherein the clamping plates are rotatably mounted to the brackets, respectively, and positioned above the memory chips; and
   a fan mounted between the clamping plates or mounted to the fixing plate.

2. The heat dissipation device of claim 1, wherein each bracket comprises a lateral plate, and a mounting plate extending up from a top end of the lateral plate opposite to the motherboard, the mounting plate defines a pivot hole in a center of a lower portion of the mounting plate, a post extends from a distal end of each clamping plate to rotatably engage in the pivot hole.

3. The heat dissipation device of claim 2, wherein the mounting plate of each bracket defines an arc-shaped slot extending through the mounting plate, the pivot hole is a center of a circle of the slot, each clamping plate defines a fixing hole adjacent to the post, two first fasteners extend through the slots and engage in the fixing holes to fasten the support to the brackets.

4. The heat dissipation device of claim 3, wherein a distance between each post and the corresponding fixing hole is equal to a radius of the slot about the pivot hole.

5. The heat dissipation device of claim 2, wherein each bracket further comprises a fixing plate perpendicularly extending form a bottom end of the lateral plate, the fixing plate of each bracket defines a pair of through holes, the motherboard defines two pairs of fixing holes therein at opposite sides of the memory chips, two pairs of second fasteners extend through the through holes of the fixing plates and engage in the fixing holes of the fixing plates of the brackets to fasten the brackets to the motherboard.

6. The heat dissipation device of claim 1, wherein the fixing plate of the support defines two fixing holes to mount the fan to the fixing plate to be positioned at each of opposite end surfaces of the memory chips.

7. The heat dissipation device of claim 1, further comprising two elastic latching members, wherein each latching member comprises a first latching portion latched to the clamping plates and two second latching portions latched configured to fasten the fan to the clamping plates.

8. The heat dissipation device of claim 7, wherein a supporting plate is attached to each clamping plate facing the other clamping plate, the supporting plate comprises a fixing portion fixed to the clamping plate and a supporting portion extending from the fixing portion toward the other clamping plate to support the fan, the first latching portion of each latching member comprises a first engaging segment to resist against a bottom surface of the supporting portion and two first curved segments extending from opposite ends of the first engaging segment to resist against the latching portion and the corresponding clamping plate.

9. The heat dissipation device of claim 8, wherein the fan comprises an upper frame and a lower frame opposite to the upper frame, the lower frame defines four fixing holes in four corners of the fan, each second latching portion comprises a connection segment extending from a corresponding first curved segment and perpendicular to the first engaging segment extending, a second engaging segment extending from a distal end of the connection segment and perpendicular to the first engaging segment and the connection segment to resist against a top surface of the lower frame, and a second curved segment extending from a distal end of the second engaging segment to be latched in the corresponding fixing holes of the fan.

* * * * *